US011182890B2

United States Patent
Koushavand (10) Patent No.: US 11,182,890 B2
(45) Date of Patent: Nov. 23, 2021

(54) EFFICIENT SYSTEM AND METHOD OF DETERMINING A PERMEABILITY RATIO CURVE

(71) Applicant: Husky Oil Operations Limited, Calgary (CA)

(72) Inventor: Behrang Koushavand, Calgary (CA)

(73) Assignee: Husky Oil Operations Limited, Calgary (CA)

( * ) Notice: Subject to any disclaimer, the term of this patent is extended or adjusted under 35 U.S.C. 154(b) by 0 days.

(21) Appl. No.: 16/289,886

(22) Filed: Mar. 1, 2019

(65) Prior Publication Data

US 2020/0279361 A1    Sep. 3, 2020

(51) Int. Cl.
*G06T 7/00* (2017.01)

(52) U.S. Cl.
CPC .. *G06T 7/0004* (2013.01); *G06T 2207/20084* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 2017/0185873 A1* | 6/2017 | Wang | ................... | G06K 9/6228 |
| 2019/0087939 A1* | 3/2019 | Hakimuddin | ........... | G06T 5/001 |
| 2020/0167654 A1* | 5/2020 | Guo | .................... | G06F 16/2246 |

OTHER PUBLICATIONS

Wu J, Yin X, Xiao H. Seeing permeability from images: fast prediction with convolutional neural networks. Science Bulletin. Sep. 30, 2018;63(18):1215-22. (Year: 2018).*
Valentín, Manuel Blanco, et al. "Estimation of permeability and effective porosity logs using deep autoencoders in borehole image logs from the brazilian pre-salt carbonate." Journal of Petroleum Science and Engineering 170 (2018): 315-330. (Year: 2018).*
Rocha, Carlos, et al. "High-resolution permeability determination and two-dimensional porewater flow in sandy sediment." Limnology and Oceanography: Methods 3.1 (2005): 10-23. (Year: 2005).*
Manchuk, John G., et al. "Advances in micromodeling using resistivity borehole images." Bulletin of Canadian Petroleum Geology 63.4 (2015): 333-344.
Niven, EB and CV Deutsch, "Calculating Permeability from FNI Images in Oil Sand Deposits," Centre for Computational Geostatistics: Report 11 212-1-212-6.
Niven, EB and CV Deutsch, "Permeability from Core Photos and Images," Centre for Computational Geostatistics: Guidebook Series 12, 45 pages.
Simonyan, Karen, and Andrew Zisserman. "Very deep convolutional networks for large-scale image recognition." arXiv preprint arXiv:1409.1556 (2014).

* cited by examiner

*Primary Examiner* — David Perlman
(74) *Attorney, Agent, or Firm* — Gordon & Jacobson, P.C.

(57) ABSTRACT

Systems and methods for field of reservoir characterization, and more specifically to more accurate and processor efficient methods of permeability modeling. The systems efficiently determine a permeability of a reservoir using a deep convolution neural network and core photographs and Vshale logs. In some aspects, the core photographs are windowed to determine a continuous permeability ratio for the reservoir.

17 Claims, 8 Drawing Sheets

FIG. 1

(prior art)

FIG. 2

(prior art)

EFFICIENT SYSTEM AND METHOD OF DETERMINING A PERMEABILITY RATIO CURVE

FIELD OF THE INVENTION

This invention is in the field of reservoir characterization, and more specifically to more accurate and processor efficient methods of permeability modeling.

BACKGROUND

In order to determine the performance of an in situ oil and gas reservoir, a geomodel may generate a 3-dimensional (3D) numerical model of the reservoir. The numerical model of the reservoir may be used to perform a reservoir simulation to simulate a flow of different liquids in the reservoir, such as for example, oil, gas, steam, water, etc. A plurality of inputs may be used for the numerical model, such as porosity, saturation, permeability (e.g. a horizontal permeability and/or a vertical permeability).

BRIEF SUMMARY

According to an aspect, there is provided a system for efficiently determining a permeability of a reservoir. The system may comprise a tangible computer-readable medium; and a processor executing instructions from the tangible computer-readable medium. The instructions may comprise: loading a deep convolution neural network into the tangible computer-readable medium; retrieving a core photograph and a Vshale log associated with the core photograph; applying at least one threshold on the core photograph to generate a binary image; calculating an average Vshale value from the Vshale log; calculating a percentage of white pixels to a total number of pixels in the binary image to produce a Vshale value; iteratively comparing the Vshale value with the average Vshale value to determine an optimal threshold; applying the optimal threshold to the core photograph to generate an optimal binary image; and applying the optimal binary image to the deep convolution neural network to determine a permeability ratio for the reservoir. The instructions may further comprise: windowing the optimal binary image to produce a rolling window; and applying the rolling window to the deep convolution neural network to determine a continuous permeability ratio for the reservoir.

According to another aspect, there is provided a system for efficiently determining a permeability of a reservoir, the system comprising: a tangible computer-readable medium; a processor executing instructions from the tangible computer-readable medium. The instructions may comprise loading a deep convolution neural network into the tangible computer-readable medium; applying a threshold to a core photograph to generate a binary image; and applying the binary image to the deep convolution neural network to determine a permeability ratio for the reservoir. The aspect may further comprise instructions to: window the binary image to produce a rolling window; and apply the rolling window to the deep convolution neural network to determine a continuous permeability ratio for the reservoir.

The instructions may further comprise retrieving a Vshale log associated with the core photograph; calculating an average Vshale value from the Vshale log, and/or calculating a percentage of white pixels to a total number of pixels in the binary image to produce a Vshale value. The instruction may iteratively compare the Vshale value with the average Vshale value to determine a threshold to apply to the core photograph to generate the binary image.

According to any and/or all aspects, the system may further comprise at least one graphics processing unit executing the deep convolution neural network. The core photograph may be retrieved from an image retrieval system.

In yet another aspect, there is provided a method for efficiently determining a permeability of a reservoir. The method may comprises: loading a deep convolution neural network into a tangible computer-readable medium; retrieving a core photograph and a Vshale log associated with the core photograph; applying at least one threshold on the core photograph to generate a binary image; calculating an average Vshale value from the Vshale log; calculating a percentage of white pixels to a total number of pixels in the binary image to produce a Vshale value; iteratively comparing the Vshale value with the average Vshale value to determine an optimal threshold; applying the optimal threshold to the core photograph to generate an optimal binary image; and applying the optimal binary image to the deep convolution neural network to determine a permeability ratio for the reservoir.

In another aspect, the method may further comprise: windowing the optimal binary image to produce a rolling window; applying the rolling window to the deep convolution neural network to determine a continuous permeability ratio for the reservoir. The deep convolution neural network may comprise four convolution blocks and a fully-connected regression block; wherein the fully-connected regression block determines the permeability ratio for the reservoir.

According to an aspect, the deep convolution neural network may comprise four convolution blocks and a fully-connected regression block; wherein the fully-connected regression block may determines the permeability ratio for the reservoir. The four convolution blocks may each comprise two stacked 2D convolution layers. The stacked 2D convolution layers may comprise a plurality of 3×3 receptive fields. The four convolution blocks may each comprise two weight layers. The four convolution blocks may each terminate with a spatial pooling block.

According to yet another aspect, the four convolution blocks may comprise a first block, a second block, a third block, and a fourth block; wherein the first block has 64 outputs, the second block has 128 outputs, the third block has 256 outputs, and the fourth block has 256 outputs.

BRIEF DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

In order to determine the performance of an in situ oil and gas reservoir, a geomodel may generate a 3-dimensional (3D) numerical model of the reservoir. The numerical model of the reservoir may be used to perform a reservoir simulation to simulate a flow of different liquids in the reservoir, such as for example, oil, gas, steam, water, etc. A plurality of inputs may be used for the numerical model, such as porosity, saturation, permeability (e.g. a horizontal permeability and/or a vertical permeability). In this aspect, a permeability ratio may be determined.

Difficulty may be experienced in populating the vertical permeability in order to generate a reliable geomodel for an oil sands or heavy oil reservoir. This difficulty may be due to scarce vertical permeability data and may be associated with the difficulty obtaining representative samples of the vertical permeability data. One or more core plugs may be taken in clean sand and any mud rich intervals are avoided. The core plugs may also experience core expansion and/or disturbance. All of these concerns may result in overestimation of the permeability, both in horizontal and/or vertical directions. The permeability may be one of the more important factors in predicting a steam chamber development and production and therefore reliability of the permeability may determine whether a reservoir is commercially viable. In particular, difficulty in determining the permeability may be experienced when evaluating a heterogeneous reservoir. Some of the difficulty may be associated with sparse sampling, biased core plug data taken preferentially from sandy or homogeneous intervals; and/or a lack of representative vertical permeability data.

Figure 1:
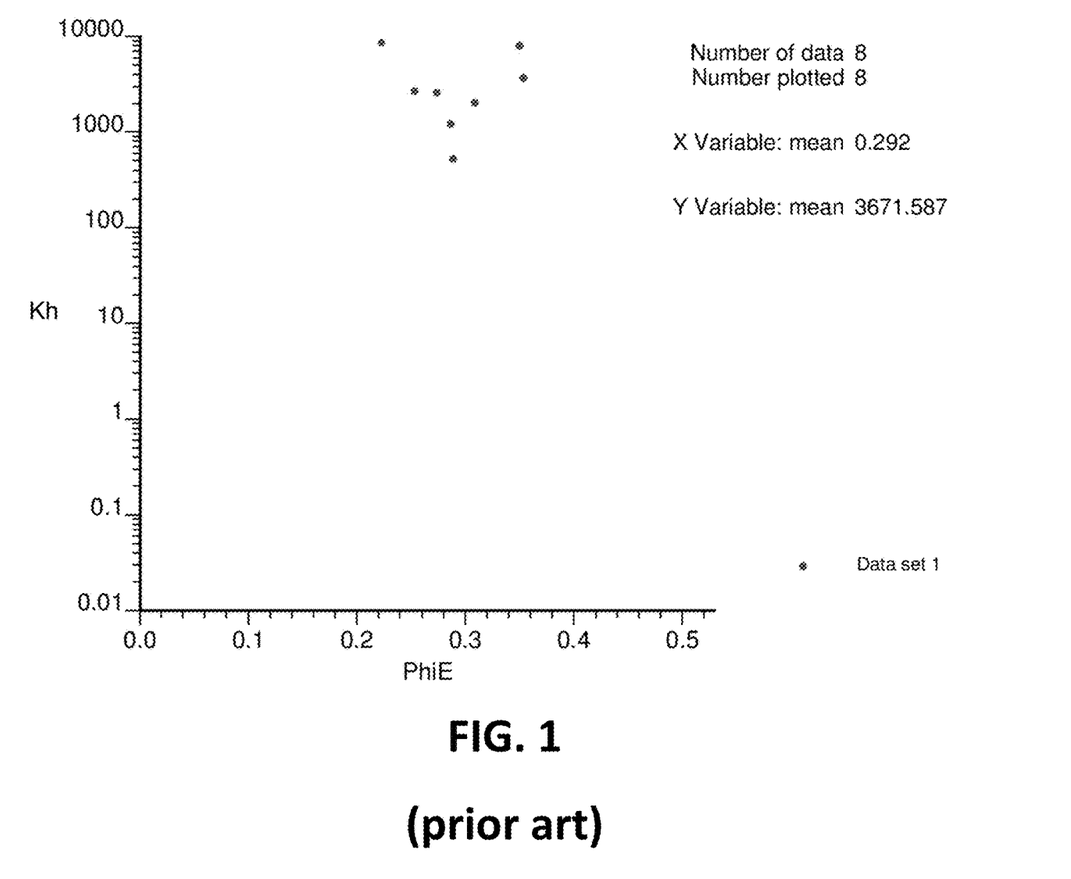
FIG. 1 is a plot of a porosity-permeability function generated using a prior art method.

In order to mitigate some of these difficulties with determining the permeability, a porosity-permeability function (such as shown in FIG. 1) between a porosity log and the permeability data may be determined. Permeability data is usually obtained by taking plugs samples from the core. Few plugs are taken from each core and therefore, there may be limited permeability data available relative to the porosity that is calculated via petrophysics equations and is available at most wells. Effective porosity may be calculated using different petrophysical logs (such as gamma ray, resistivity, density) for every depth that all measurement logs exist. Since the porosity log may be available through petrophysical data analysis, the permeability model or curve may be calculated from a porosity model or curve. One problem associated with determining this porosity-permeability function is that the determination relies on a sufficient amount of data necessary to derive a representative function. Also, the permeability model calculated this way is resolution dependent on a resolution of the porosity curve. Due to the low resolution of the porosity log, small interbedded intervals may not be captured. The interbedded facies may have a large impact on the vertical permeability and consequently the economics of the reservoir.

Another method of mitigating some of these difficulties with determining the permeability may be via a micromodelling technique developed in 2009 to 2016 by the Center for Computational Geostatistics further described in: Niven, E B, Deutsch, C V (2009) *Calculating Permeability from FMI Images in Oil Sand Deposits*, Centre for Computational Geostatistics: Report 11, 212-1-212-6; Niven, E B, Deutsch, C V (2011) *Permeability from Core Photos and Images*, Centre for Computational Geostatistics: Guidebook Series 12, 45 p; and Manchuk, J, & Deutsch, C (2014) *Advances in micromodeling using resistivity borehole images*, paper 211, In CCG annual report 16, University of Alberta, Edmonton. The contents of these references are herein explicitly incorporated by reference in their entirety.

Figure 2:
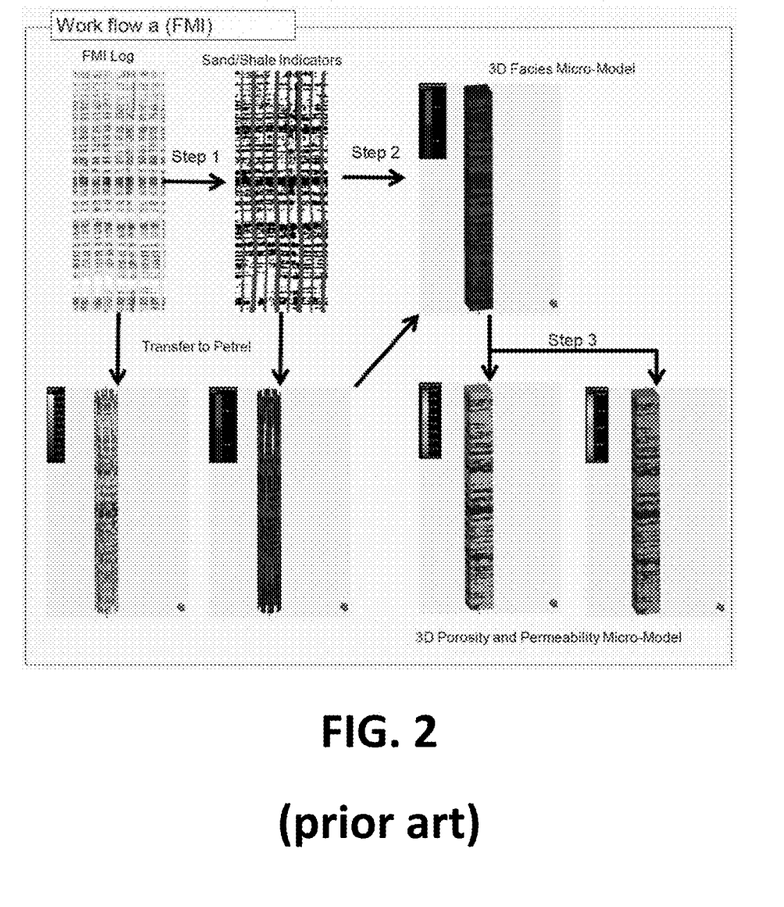
FIG. 2 is a flow chart of a micro-modelling technique using a fullbore formation microimager (FMI)

The micro-modelling technique, shown in FIG. 2, involves generating a sand and shale micro-scale facies model from core photos or hyperspectral data, or fullbore formation microimager (FMI). For each micro-cell, a porosity value and a permeability value are randomly assigned from a user-defined distribution. A flow simulation is run on the micromodel to generate the permeability values. A $K_v/K_h$ function (e.g. the vertical permeability over the horizontal permeability) is then derived and used in the geomodel.

Micromodelling may be highly sensitive to the input parameters and may require a lot of fine tuning parameters and expertise to adjust these fine tuning parameters. Micromodelling may also be computational expensive requiring long computation times for calculating only a few permeability values. The aspects described herein may improve computation times and/or may permit determining the permeability on computing systems of limited processing power.

Figure 3:
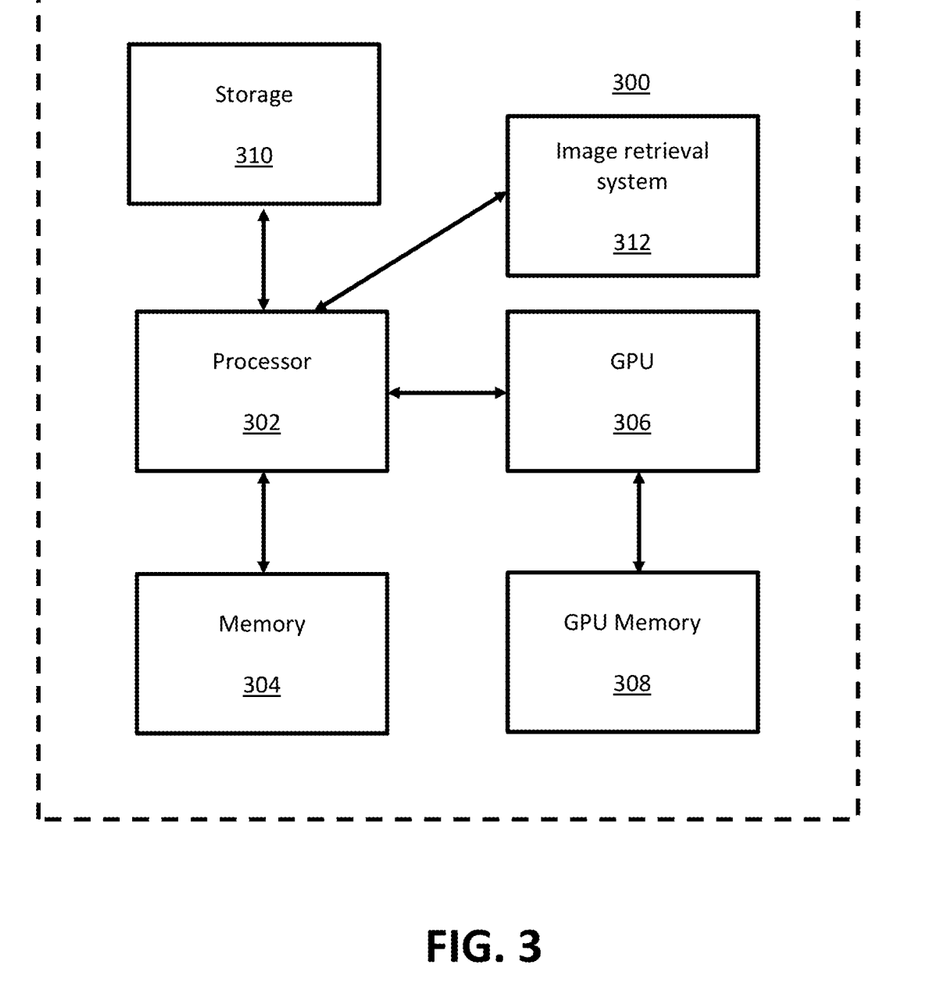
FIG. 3 is a block diagram of a processing structure for executing steps of predicting a permeability ratio.

Turning to FIG. 3, a processing structure 300 for determining the permeability (e.g. the horizontal permeability and the vertical permeability) is shown. The system 300 may comprise a processor 302 may be in communication with a memory 304 (e.g. a tangible computer-readable medium). The processor 302 may execute one or more instructions from the memory 304 and/or storing data into the memory 304. The processor 302 may also communicate with a long-term storage device 310, such as a solid state drive, hard drive, cloud-based storage, etc., for storing or caching data. The processor 302 may also communicate with a graphics processing unit (GPU) 306. The GPU 306 may have additional GPU memory 308 that provides faster access and write speeds than the memory 304. The GPU 306 and the GPU memory 308 may be configured to execute instructions for a deep convolutional neural network 400 shown in FIG. 4 as described in further detail below.

Figure 5:
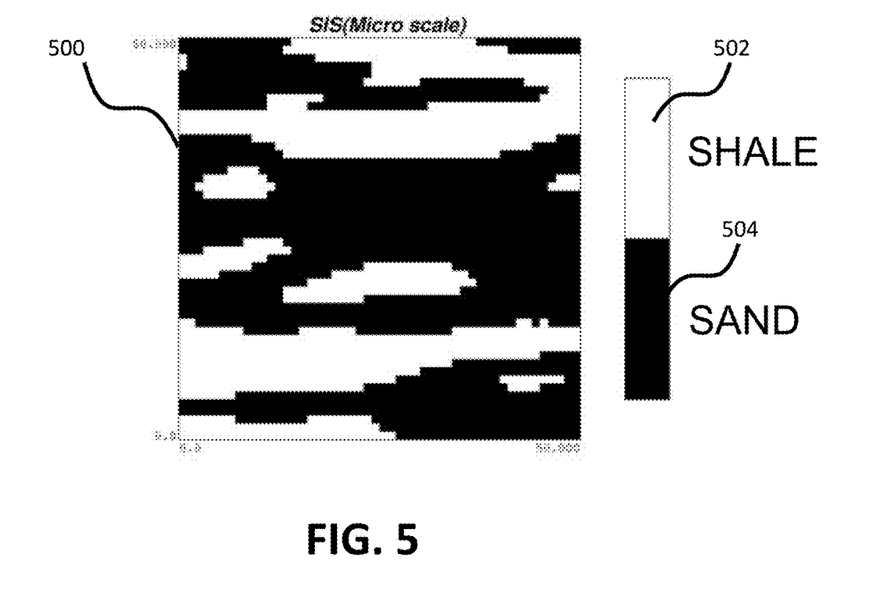
FIG. 5 is an example of a binary core photo for use with the neural network.

The processor 302 may execute instructions implemented in Python to retrieve a digital core photograph 500, such as shown in FIG. 5, associated with the reservoir from an image retrieval system 312 which may load the core photo 500 from a storage 310 and the processor 302 may provide the image data to the GPU 306. The core photo 500 may be a binary image with one or more white areas 502 corresponding to shale and one or more black areas 504 corresponding to sand.

Figure 4:
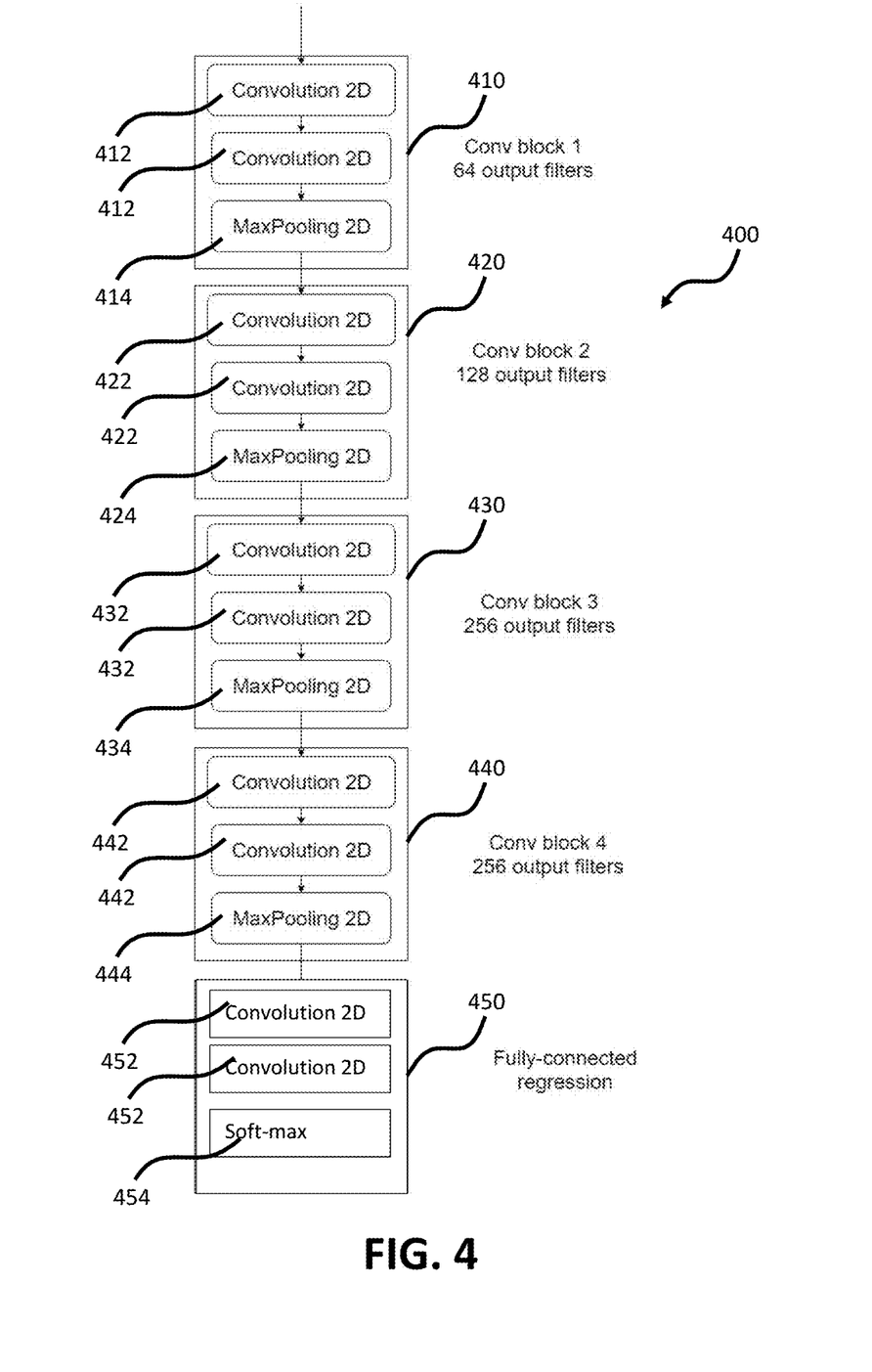
FIG. 4 is a block diagram of a deep convolution neural network for predicting the permeability ratio.

The GPU 306 may execute instructions in order to generate the deep convolution neural network 400 shown in more detail in FIG. 4. The neural network 400 may be adapted from the VGG16 architecture as disclosed in Simonyan, Karen, Zisserman, Andrew (2015) *Very Deep Convolutional Networks for Large-Scale Image Recognition*, International Conference on Learning Representations, May 7-9, 2015, herein explicitly incorporated by reference in its entirety. The instructions executing on the GPU 306 may be implemented using the Keras library to build Tensorflow models. and may be adapted to execute on one or more GPUs 306. The GPUs 306 may receive full-sized image data at multiple scales and may exploit data parallelism by splitting each batch of training images into several GPU batches processed in parallel on each GPU 306. After the GPU batch, one or more gradients may be computed, the gradients may be averaged to obtain a gradient of the full batch. In this aspect, the neural network 400 comprises four convolution blocks 410, 420, 430, 440. Each of the convolution blocks 410, 420, 430, 440 may each comprise two stacked 2D convolution layers 412.

For the first convolution block 410, the two stacked 2D convolution layers 412 may have 3×3 receptive fields throughout the whole net, which may be convoluted with an input at every pixel. The first convolution block 410 may have 2 weight layers and a width of the convolution layers 412 may be 64 outputs. The first convolution block 410 terminates with a spatial pooling block 414 that may perform max-pooling over a 2×2 pixel window. An output of the spatial pooling block 414 may be fed into an input of the second convolution block 420.

For the second convolution block 420, the two stacked 2D convolution layers 422 may also have 3×3 receptive fields throughout the whole net, which may be convoluted with the input of the convolution block 420. The second convolution block 420 may have 2 weight layers and a width of the convolution layers 422 may be 128 outputs. The second convolution block 420 terminates with a spatial pooling block 424 that may perform max-pooling over a 2×2 pixel window. An output of the spatial pooling block 424 may be fed into an input of the third convolution block 430.

For the third convolution block 430, the two stacked 2D convolution layers 432 may also have 3×3 receptive fields throughout the whole net, which may be convoluted with the input of the convolution block 430. The third convolution block 430 may have 2 weight layers and a width of the convolution layers 432 may be 256 outputs. The third convolution block 430 terminates with a spatial pooling block 434 that may perform max-pooling over a 2×2 pixel window. An output of the spatial pooling block 434 may be fed into an input of the third convolution block 440.

For the fourth convolution block 440, the two stacked 2D convolution layers 442 may also have 3×3 receptive fields throughout the whole net, which may be convoluted with the input of the convolution block 440. The fourth convolution block 440 may have 2 weight layers and a width of the convolution layers 442 may be 256 outputs. The fourth convolution block 440 terminates with a spatial pooling block 444 that may perform max-pooling over a 2×2 pixel window. An output of the spatial pooling block 444 may be fed into an input of a fully-connected regression block 450.

Finally, the neural network 400 may terminate with the fully-connected regression block 450. The regression block 540 may comprise two connected layers with 512 nodes and a soft-max layer 452. An output of the fully-connected regression block 450 may be a ratio of the vertical permeability to the horizontal permeability ($k_v/k_h$) for the particular reservoir.

In this aspect, the neural network 400 may be trained using TensorFlow. In order to train the neural network 400, a large number of training and validation data may be synthetically generated. Synthetically generated core images were generated because there are very few core images available and as previously discussed, the few core images available are sampled from sandy intervals. The training and validation data may comprise approximately 700,000 synthetic core images generated by using an unconditional geostatistical simulation.

The unconditional geostatistical simulation may be used to generate a facies (sand shale) image using a sequential indicator simulation technique. The input parameter at this stage may be the horizontal and vertical variogram ranges. By changing this ratio, synthetic core images may be produced that relate to different depositional environment. Examples of such synthetic core photos are presented in FIG. 6. From left to right the ratio of horizontal to vertical variogram is increasing and the produced images can be related to an interbedded reservoir at the left to a breccia type facies at the right.

A permeability ratio ($k_v/k_h$) (and/or vertical permeability $k_v$ and horizontal permeability $k_h$) may be calculated for each core photo by using a micro-modelling and a flow simulation. For example, the horizontal permeability and vertical permeability of a simulated 2D slice may be calculated using Darcy's Law. A constant pressure gradient may be considered in a direction of flow and one or more no-flow boundary conditions may be imposed in the other directions as described in *Permeability from Core Photos and Images*, Centre for Computational Geostatistics: Guidebook Series 12, 45 p, herein explicitly incorporated by reference in its entirety.

The synthetic training and validation data may be split into a training data set (e.g. 90% of the training and validation data) and a validation data set (e.g. 10% of the training and validation data). The neural network 400 may be fed each synthetic core photo to predict the horizontal permeability and/or the vertical permeability for each synthetic core photo. Once the neural network 400 has been trained, the validation data set may be used as a blind test to measure a performance of the trained neural network 400.

Figure 6:
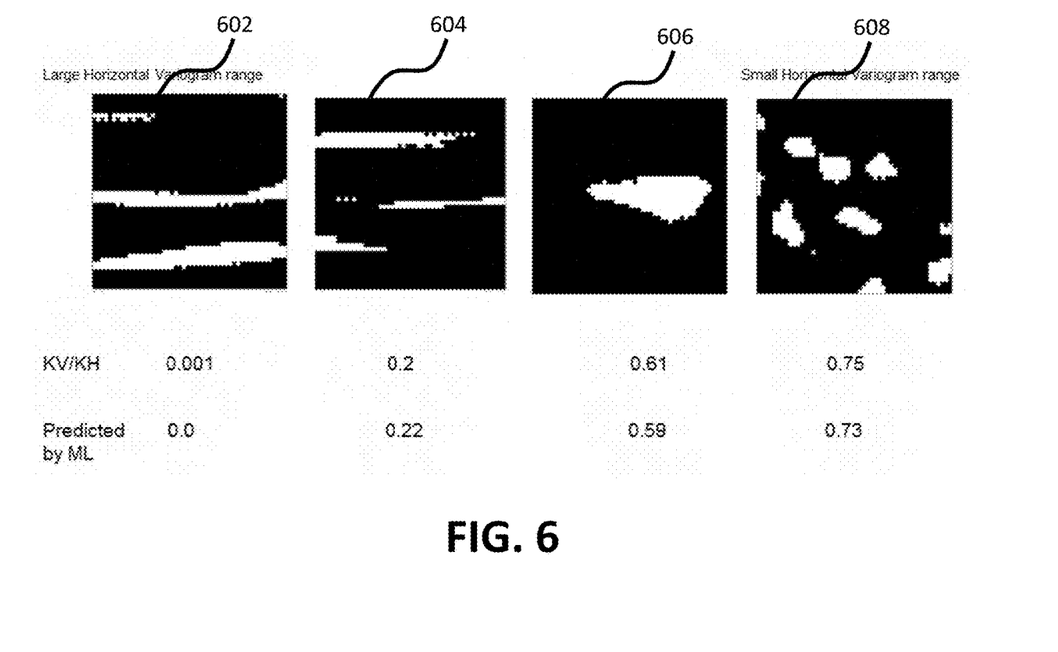
FIG. 6 shows four examples of binary core photos used with the neural network and associated predicted permeability ratios.

For example, as shown in FIG. 6, four synthetically generated core images 602, 604, 606, 608 are shown. As may be seen, the core image 602 and 604 may have a large horizontal variogram range and the core images 606 and 608 may have a small horizontal variogram range. A calculated permeability ratio for the large horizontal variogram range is 0.001 and 0.2 respectively. The neural network 400 has predicted the permeability ratio to be 0.0 and 0.22 respectively. Similarly, the calculated permeability ratio for the small horizontal variogram range is 0.61 and 0.75 respectively. The neural network 400 has predicted the permeability ratio to be 0.59 and 0.73 respectively.

Turning to FIG. 7 and FIGS. 8A to 8D, the processor 302 may execute instructions to present a graphical user interface (GUI) 700 on a display (not shown). The user may operate the GUI 700 in order to initiate the processor 302 to load Vshale and effective porosity (PhiE) logs from the storage 310 as shown particularly in FIG. 8A. In this aspect, the processor 302 may be configured to read LAS format logs and may search for Vshale and effective porosity logs within the LAS file. In some aspects, the neural network 400 may not require the effective porosity logs.

Figure 7:
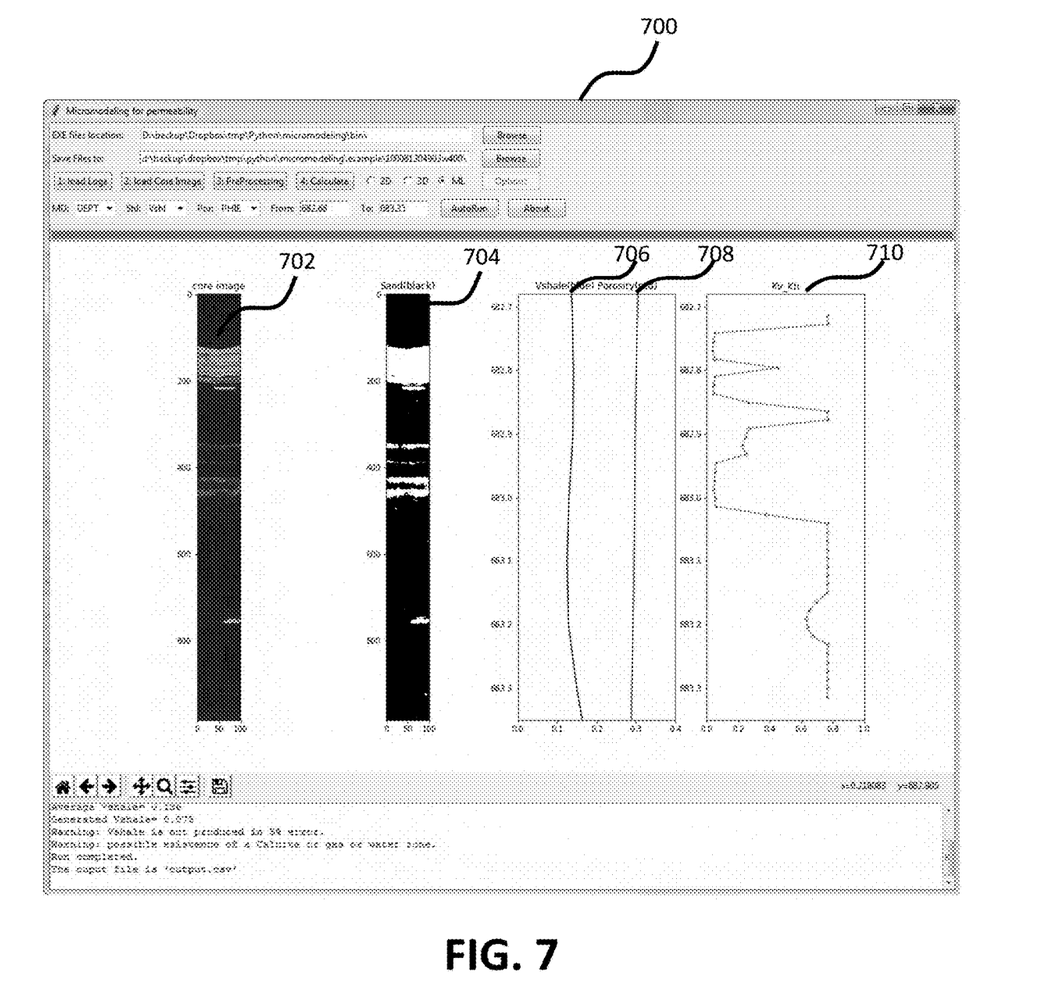
FIG. 7 is a screenshot of an example graphical user interface (GUI)
Figure 8A:
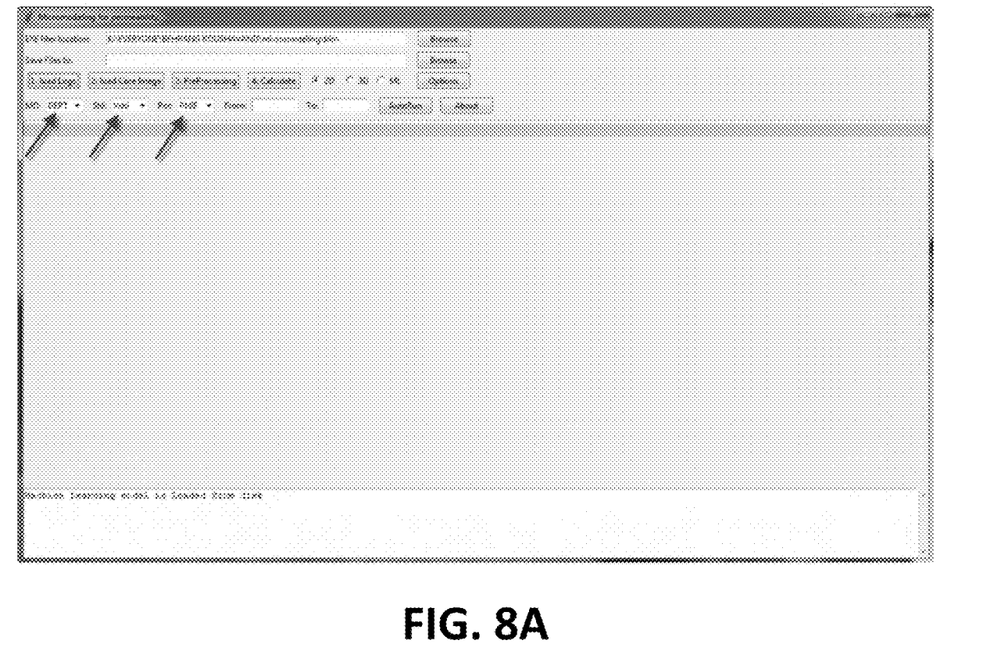
FIGS. 8A to 8D are screenshots of the example GUI for a number of steps of operating the neural network.
Figure 8B:
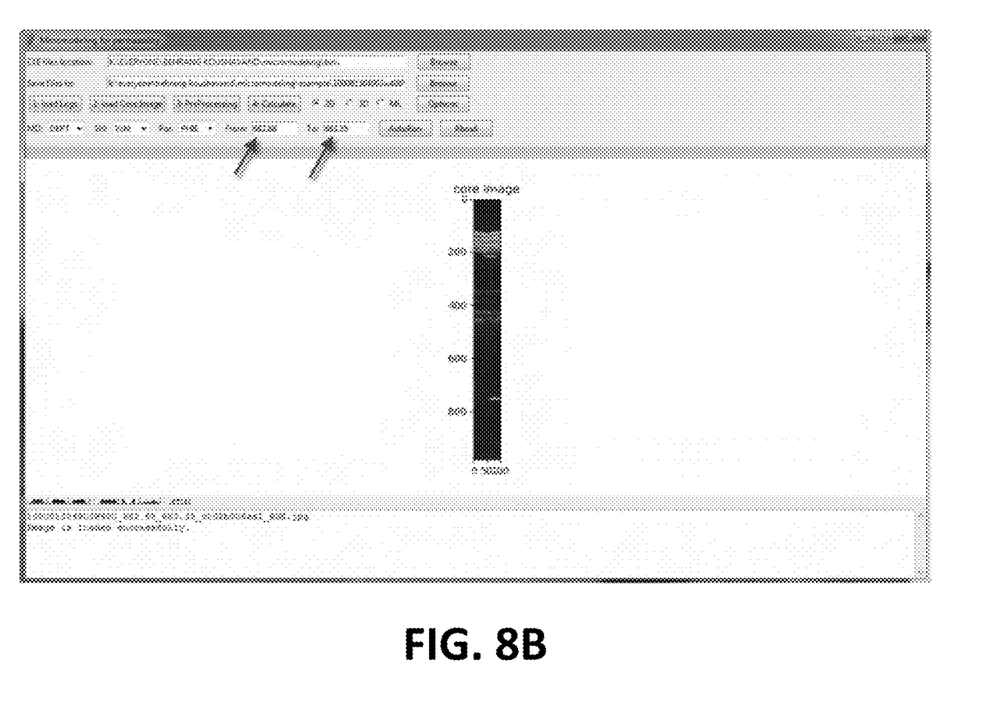

The user may then operate the GUI 700 in order to initiate the processor 302 to import or retrieve a core photo 702 from the image retrieval system 312, which may be displayed on the display as shown particularly in FIG. 8B. In this aspect, the image retrieval system 312 may retrieve a hyperspectral image or a core photo. An associated depth for the core image may be entered in a "from" field and a "to" field. If a hyperspectral image is selected, the associated depth may be retrieved from a filename of the hyperspectral image. For example if the hyperspectral image filename is:

"100131304903W400_677.96_678.66_c002b006bs1_RGB.jpeg", the processor 302 may fill the "from" field and "to" field with: 667.96 and 678.66 respectfully. In other aspects, the associated depth may be retrieved from metadata or other methods.

Figure 8C:
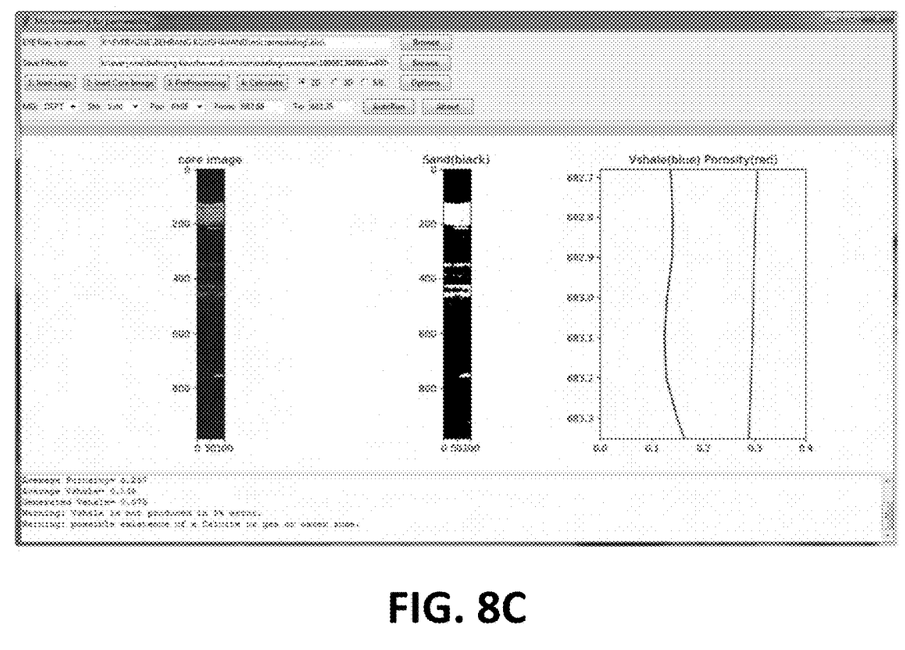

The processor 302 may preprocess the core photo 702 by applying a threshold to the core photo 702 in order to generate a binary image 704 as shown particularly in FIG. 8C. The white regions correspond to shale 502 and the black regions may correspond to sand 504. In this aspect, an optimum threshold may be determined automatically by using a range of different thresholds. For each threshold, a binary image 704 may be generated and for each image, a vshale is calculated as a percentage of white pixels to a total number of pixels. This vshale should correspond to an average Vshale calculated from the Vshale log. If these vshale value does do not match, a different threshold number may be used until the binary image 704 has a vshale value close to the average vshale from the vshale log. In this aspect, the optimum threshold may be determined by matching data from the Vshale log with the generated binary image 704. If the processor 302 calculates an absolute difference between the average Vshale value and the calculated Vshale value for the binary image 704 of greater than 5%, the processor 302 may present a notification on the display to the user. This optimal threshold may be applied to the core photo 702 to generate an optimal binary image 704 that closely matches the measured Vshale log data. The processor 302 may present a vertical shale profile 706 from the Vshale data on the display and the processor 302 may also present a porosity profile 708 on the display as shown in FIG. 8C.

In some aspects, the permeability ratio may be calculated, in addition or alternative to the neural network 400, using the conventional micro-modelling method. The micro-modelling method may be more inefficient when executed by the processor 302 and/or GPU 306 and may require additional parameters necessary to fine tune in order to provide accurate results. For example, the conventional micro-modelling to calculate 45 $k_v/k_h$ values make take approximately 25-minutes and may require 5-15 minutes to fine-tune the parameters depending on the expertise of the operator. The system and method described herein may take less than approximately 2-seconds to generate the same $k_v/k_h$ values without any fine-tuning. The system and method described herein is significantly more processor efficient.

Figure 8D:
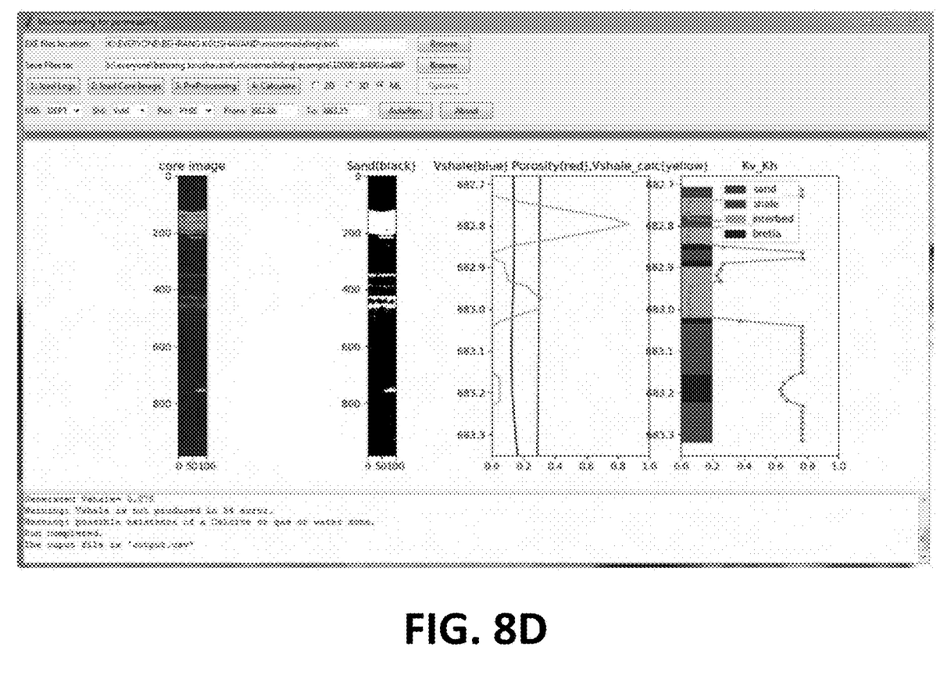

The image data from the optimal binary image 704 may then be provided to the neural network 400 to produce a continuous permeability ratio ($k_v/k_h$) 710, as shown in FIG. 8D, may be generated with a rolling window from a top of the binary image 704 to a bottom of the binary image 704 in order to generate a permeability ratio curve. The window size may be user specified but may be the same as the Vshale (GR) log (e.g. about 10-cm to about 30-cm). In this aspect, the rolling window may be square with a width and length equal to the width of the core photo 702 or the binary image 704. The vertical permeability may then be determined by the processor 302 by multiplying the horizontal permeability by the permeability ratio ($k_v/k_h$). In another aspect, the neural network 400 may produce a permeability ratio 710 for the entire optimal binary image 704.

As described herein, the neural network 400 may calculate the permeability ratio ($k_v/k_h$) 710 requiring significantly less processing and/or memory resources than the conventional micro-modelling method while requiring less parameters and fine tuning by the user. Since the neural network 400 requires less processing and/or memory resources, the continuous permeability ratio curve may be generated. The continuous permeability ratio curve 710 may improve accuracy with regard to the actual geology as it may be input directly into geomodels to depict a more representative reservoir model. The increased accuracy of the continuous permeability ratio curve 710 may also reduce uncertainty of thermal projects, provide more accuracy in economic forecasting and decision making for every thermal project. Since the permeability ratio may provide a close relationship with economics of steam-assisted gravity drainage (SAGD) projects, the results of the neural network 400 may provide an objective parameter for ranking of one or more future projects.

In another aspect, the facies model may also be extracted from the permeability ratio curve when used in combination with other petrophysical logs, such as Vshale and density logs.

Although the description herein implements a VGG9 neural network 400, other aspects may implement other types of deep neural networks, such as an Inception network, a single-domain learning network (SDNet), or a ResNet network. As noted herein, the neural network 400 described herein has 9-layers in order to operate more efficiently on the processing structure 300 with more limited processing power, such as an Intel® Xeon® CPU ES-1650 v4 @ 3.6 GHz with a NVidia Quadro P4000 GPU and 64 GB of RAM running a Windows 10 Operating System. Other aspects may have neural networks 400 with more layers for processing structures 300 with more processing power.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A system for predicting permeability of a reservoir, the system comprising:
    a non-transitory computer-readable medium;
    a processor executing instructions from the non-transitory computer-readable medium to:
        load a deep convolution neural network into the non-transitory computer-readable medium;
        retrieve a core photograph and a Vshale log associated with the core photograph;
        apply at least one threshold on the core photograph to generate a binary image;
        calculate an average Vshale value from the Vshale log;
        calculate a percentage of white pixels to a total number of pixels in the binary image to produce a Vshale value;
        iteratively compare the Vshale value with the average Vshale value to determine an optimal threshold;
        apply the optimal threshold to the core photograph to generate an optimal binary image;
        utilize a rolling window on the optimal binary image; and
        apply the rolling window from the optimal binary image to the deep convolution neural network to determine a permeability ratio curve representing relationship between permeability in a horizontal direction and permeability in a vertical direction for the reservoir.

2. The system of claim 1, wherein the deep convolution neural network comprises four convolution blocks and a fully-connected regression block; wherein the fully-connected regression block determines the permeability ratio for the reservoir.

3. The system of claim 2, wherein the four convolution blocks each comprise two stacked 2D convolution layers.

4. The system of claim 3, wherein the stacked 2D convolution layers comprise a plurality of 3×3 receptive fields.

5. The system of claim 4, wherein the four convolution blocks each comprise two weight layers.

6. The system of claim 5, wherein the four convolution blocks each terminate with a spatial pooling block.

7. The system of claim 6, wherein the four convolution blocks comprise a first block, a second block, a third block, and a fourth block; wherein the first block has 64 outputs, the second block has 128 outputs, the third block has 256 outputs, and the fourth block has 256 outputs.

8. The system of claim 1, further comprising at least one graphics processing unit executing the deep convolution neural network.

9. The system of claim 1, wherein the core photograph is retrieved from an image retrieval system.

10. A method for predicting permeability of a reservoir, the method comprising:
executing instructions from a non-transitory computer-readable medium on a processor, wherein the execution of the instructions on the processor is configured to:
load a deep convolution neural network;
retrieve a core photograph and a Vshale log associated with the core photograph;
apply at least one threshold on the core photograph to generate a binary image;
calculate an average Vshale value from the Vshale log;
calculate a percentage of white pixels to a total number of pixels in the binary image to produce a Vshale value;
iteratively compare the Vshale value with the average Vshale value to determine an optimal threshold;
apply the optimal threshold to the core photograph to generate an optimal binary image;
utilize a rolling window on the optimal binary image; and
apply the rolling window from the optimal binary image to the deep convolution neural network to determine a permeability ratio curve representing relationship between permeability in a horizontal direction and permeability in a vertical direction for the reservoir.

11. The method of claim 10, wherein the deep convolution neural network comprises four convolution blocks and a fully-connected regression block; wherein the fully-connected regression block determines the permeability ratio for the reservoir.

12. The method of claim 11, wherein the four convolution blocks each comprise two stacked 2D convolution layers.

13. The method of claim 12, wherein the stacked 2D convolution layers comprise a plurality of 3×3 receptive fields.

14. The method of claim 13, wherein the four convolution blocks each comprise two weight layers.

15. The method of claim 14, wherein the four convolution blocks each terminate with a spatial pooling block.

16. The method of claim 15, wherein the four convolution blocks comprise a first block, a second block, a third block, and a fourth block; wherein the first block has 64 outputs, the second block has 128 outputs, the third block has 256 outputs, and the fourth block has 256 outputs.

17. A system for predicting permeability of a reservoir, the system comprising:
a non-transitory computer-readable medium;
a processor executing instructions from the non-transitory computer-readable medium to:
load a deep convolution neural network;
apply an optimal threshold to a core photograph to generate a binary image;
utilize a rolling window on the binary image; and
apply the rolling window from the binary image to the deep convolution neural network to determine a permeability ratio curve representing relationship between permeability in a horizontal direction and permeability in a vertical direction for the reservoirs;
wherein the instructions executed by the processor are further configured to retrieve a Vshale log associated with the core photograph, calculate an average Vshale value from the Vshale log, calculate a percentage of white pixels to a total number of pixels in the binary image to produce a Vshale value, and iteratively compare the Vshale value with the average Vshale value to determine the optimal threshold to apply to the core photograph to generate the binary image.

* * * * *